United States Patent [19]

Prakash et al.

[11] Patent Number: 5,709,760
[45] Date of Patent: Jan. 20, 1998

[54] THIN GAUGE, FINE DIAMETER STEEL CORD REINFORCED TIRE PLY FABRIC WHICH IS LAP SPLICED

[75] Inventors: Amit Prakash, Hudson; William James Head, Ravenna; Gary Edwin Tubb, Copley; Terry Kenneth Woods, Canton, all of Ohio

[73] Assignee: The Goodyear Tire & Rubber Company, Akron, Ohio

[21] Appl. No.: 544,510

[22] Filed: Oct. 18, 1995

[51] Int. Cl.$^6$ .................. B29D 30/16; B32B 3/00; B60C 9/04; B60C 9/08
[52] U.S. Cl. .................. 152/556; 152/548; 152/560; 156/124; 156/133; 156/134; 156/157; 156/906; 156/907; 428/57; 428/114; 428/220; 428/295.4
[58] Field of Search .................. 428/57, 295, 114, 428/220, 295.4, 295.7, 296.1; 156/123–124, 157, 133–134, 218, 906, 907; 152/451, 548, 556, 560, DIG. 15, 526, 527, 532

[56] References Cited

U.S. PATENT DOCUMENTS

| | | |
|---|---|---|
| 2,754,887 | 7/1956 | Wykoff . |
| 3,027,289 | 3/1962 | Gitzinger . |
| 3,826,297 | 7/1974 | Alderfer .................. 152/560 X |
| 4,232,723 | 11/1980 | Gazuit . |
| 4,261,393 | 4/1981 | Saito et al. . |
| 4,465,536 | 8/1984 | Makino et al. . |
| 4,466,473 | 8/1984 | Matyja et al. . |
| 4,733,709 | 3/1988 | Lambillotte et al. . |
| 4,768,575 | 9/1988 | Bruner et al. . |
| 4,810,317 | 3/1989 | Lang . |
| 4,946,525 | 8/1990 | Aupic et al. . |
| 4,966,216 | 10/1990 | Kawasaki et al. .................. 152/556 |
| 5,062,462 | 11/1991 | Rye et al. . |
| 5,200,009 | 4/1993 | Tokita .................. 152/548 X |
| 5,273,601 | 12/1993 | Sergel et al. . |
| 5,327,353 | 7/1994 | Nagano . |
| 5,328,532 | 7/1994 | Azuma et al. . |
| 5,437,751 | 8/1995 | Hirano et al. .................. 152/548 X |
| 5,490,551 | 2/1996 | Prakash et al. .................. 152/556 |

FOREIGN PATENT DOCUMENTS

| | | |
|---|---|---|
| 0 120 623 | 10/1984 | European Pat. Off. .................. 156/134 |
| 0407134 | 1/1991 | European Pat. Off. . |
| 0644070 | 3/1995 | European Pat. Off. . |
| 2389483 | 12/1978 | France . |
| 59-195406 | 11/1984 | Japan . |
| 5221204 | 8/1993 | Japan . |

OTHER PUBLICATIONS

Abstract of JP4–173239, Jun. 19, 1992, Yokohama Rubber Co. Ltd., Nobon et al.

*Primary Examiner*—Adrienne C. Johnstone
*Attorney, Agent, or Firm*—David L. King

[57] ABSTRACT

A thin gauge, fine diameter steel cord reinforced tire ply fabric 2 is lap spliced. The steel cord 1 has one or more filaments 9, and each filament has a percent elongation of over 2.5% and tensile strength of at least $(-2000D+4400 \text{ MPa}) \times 95\%$, where D is the diameter of the filament in millimeters. For passenger and lightly loaded trucks the fabric 2 is manufactured using a preferred cord 1 which is a $1+5\times0.18$ mm cord spaced 14 ends per inch, and for heavier loaded vehicles such as light trucks load rated E or greater the number of cords 1 is increased to 28 ends per inch. The fabric 2 has a gauge thickness g in the range of the cord diameter C+0.22 mm to C+1.25 mm.

16 Claims, 2 Drawing Sheets

THIN GAUGE, FINE DIAMETER STEEL CORD REINFORCED TIRE PLY FABRIC WHICH IS LAP SPLICED

BACKGROUND OF THE INVENTION

The present invention relates to a steel cord reinforced fabric employing fine diameter super high tensile cords embedded in elastomeric material and a method of forming a lap splice for adjoining ends of the fabric. More particularly the invention relates to improvements in construction and assembly which enable the fabric to be used as the single ply reinforcement for radial passenger and light truck tires.

Historically, radial ply passenger and light truck tires have employed a single ply reinforced by synthetic cords of polyester or nylon which, when lap spliced, created unsightly sidewall indentations. These indentations resulted from a doubling of the number of cords at the lap splice location. A lap splice is the overlapping of the adjoined ends of the ply. Although unsightly these indentations have very little detrimental effect on the tire's performance.

When steel cords were used such as in commercial truck tires, they were of relatively large diameter and embedded in a sufficient coating of calendered rubber to permit butt splicing. These heavily loaded tires required sufficient cord strength to handle the service conditions of high inflation pressure and load. The steel cords reinforced fabric being butt spliced prevented the steel cords from being radially overlapped.

Alternative constructions of splicing tires to eliminate the sidewall undulations problem were conceived. In U.S. Pat. No. 4,261,393, a Shigeru Saito invented a tire cord fabric employing either end cords of about ½ the diameter or alternatively cords of uniform diameter but spaced twice the distance at the end portions of the ply where the lap splice was to occur. This prior art invention although helpful in the construction of rolls of fabric is of little value to the actual tire building. The reason is that tires are made in a variety of sizes and diameters. To effectively work as a radial ply the fabric must be built to a precise length for each size and then precisely wrapped upon the tire building drum with no variation in tolerances for assembly. A slight over or under lap would create the double strength problem or worse a weak point in the splice joint. Naturally, the practical implementation of such a concept is virtually unworkable.

The present invention described below provides a unique combination of components which permit the use of lap spliced radial ply steel cord reinforced fabric in passenger and light truck tires.

SUMMARY OF THE INVENTION

A steel cord reinforced tire ply fabric 2 having a first end 4 and a second end 5 is disclosed.

The fabric 2 has a plurality of uniformly spaced fine diameter steel cords 1, the cords 1 have one or more filaments 9, each filament 9 having a tensile strength of at least $(-2000D+4400 \text{ MPa}) \times 95\%$, where D is the diameter of the filament in millimeters at a percent elongation of over 2.5%. The overall cord diameter C is less than 0.75 mm.

The cord 1 can be a monofilament of 0.25 mm or less in diameter, preferably about 0.175 mm and having a tensile strength of about 4000 MPa at over 2.5% elongation. Alternatively, the cord 1 can be 1+5×0.18 mm or 3×0.18 mm cords or any other very high tensile strength cord with a diameter C meeting the above physical characteristics.

The steel cords 1 are embedded in an elastomeric material 3. The elastomeric material 3 has a very thin gauge g thickness in the range of (the cord diameter C plus 0.22 mm) to (C plus 1.25 mm).

Upon assembly and prior to vulcanization the first and second ends 4,5 are lap spliced overlapping and substantially aligning at least one cord 1 of the respective first and second ends 4,5 as measured at the equatorial plane of the tire. In one embodiment of the invention at least one elastomeric strip 6 of material is applied over the lap splice. The strip 6 may be unreinforced or may be synthetic fabric reinforced.

For most passenger and light truck tires, the fabric 2 is manufactured with the cords 1 being spaced preferably at 14 ends per inch. For more heavily loaded tires for passenger and light truck tires the fabric is made with preferably 28 ends per inch.

DEFINITIONS

"Axial" and "axially" means the lines or directions that are parallel to the axis of rotation of the tire.

"Bead" means that part of the tire comprising an annular tensile member wrapped by ply cords and shaped, with our without other reinforcement elements such as flippers, chippers, apexes, toe guards and chafers, to fit the design of the tire rim.

"Belt structure" means at least two layers of plies of parallel cords, woven or unwoven, underlying the tread, unanchored to the bead, and having both left and right cord angles in the range from about 17 to about 27 degrees with respect to the equatorial plane (EP) of the tire.

"Carcass" means the tire structure apart from the belt structure, the tread and the undertread, but including the beads. The carcass ply includes reinforcing cords embedded in an elastomeric substance and that these components are considered to be a single entity. The "main portion of the carcass ply" means the portion of the carcass ply which extends between the bead cores.

"Cord" means one or more of the reinforcement elements, formed by one or more filaments/wires which may or may not be twisted or otherwise formed and which may further include strands that may or may not be also so formed.

"Ply" means a continuous layer of rubber-coated parallel filaments.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 75° and 105° with respect to the equatorial plane of the tire.

"Rivet" means the open space between cords in a layer.

"Tensile strength" is determined by ASTM A370-92 as applied to steel wire product.

DETAILED DESCRIPTION OF THE INVENTION

Figure 1:
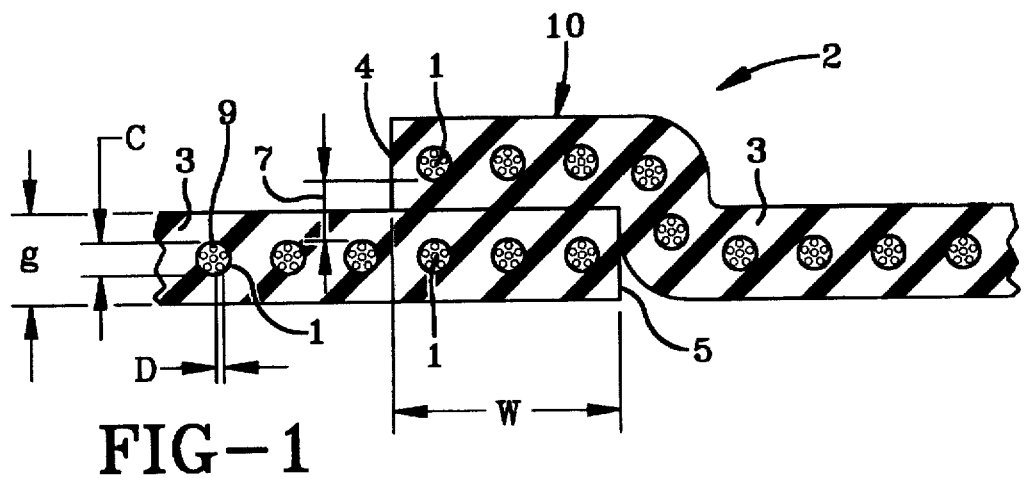
FIG. 1 is a cross-sectional view of a portion of the steel cord reinforced ply fabric at a lap splice joint.

FIG. 1 shows a lap splice joint 10 of the steel cord reinforced fabric ply 2.

The spliced joint overlaps at the mating ends 4 and 5 a distance W along the entire width of the joint. The distance W is at least of sufficient distance that at least one cord 1 from end 4 overlaps and is substantially aligned with at least one cord 1 from end 5, preferably 3 or more cords 1. Ideally the lap distance W is at least 3 mm and preferably not greater than 20 mm.

Figure 1A:
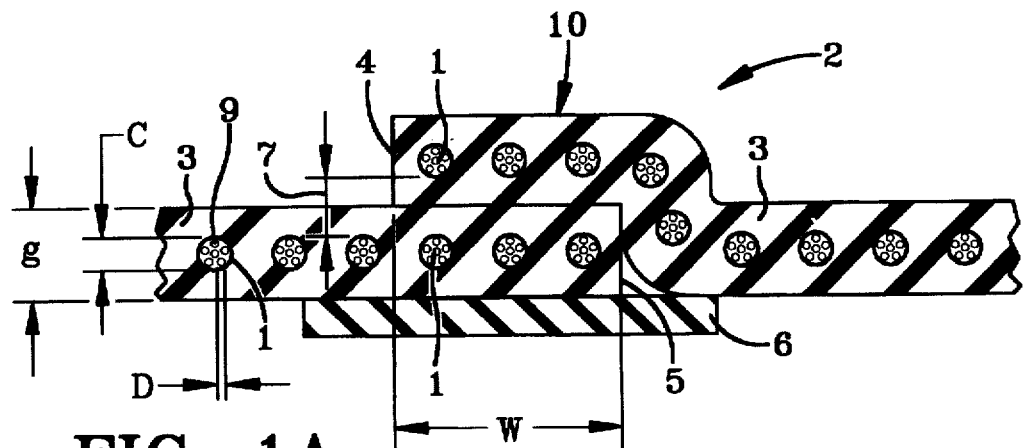
FIG. 1A is an alternative embodiment of the invention of FIG. 1.
Figure 2:
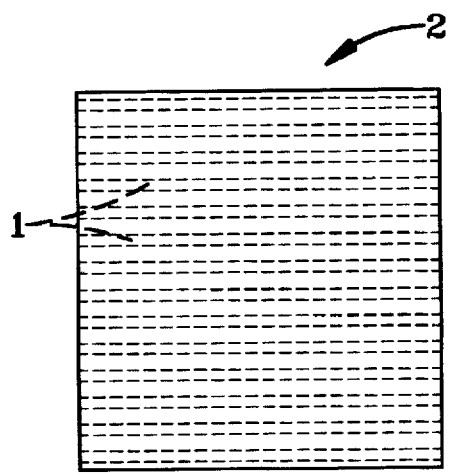
FIG. 2 is a plan view of the steel cord reinforced ply fabric for a radial ply tire.

As shown in FIG. 1A the joint 10 may alternatively include an elastomeric strip of material 6 overlapping at least one surface of the joint 10. The elastomeric strip 6 can be unreinforced or alternatively synthetic fabric reinforced.

The joint 10 relies on the tackiness of the unvulcanized elastomer to hold the joint together during the tire building process. After vulcanization the joint ends 4 and 5 are permanently affixed.

Figure 3:
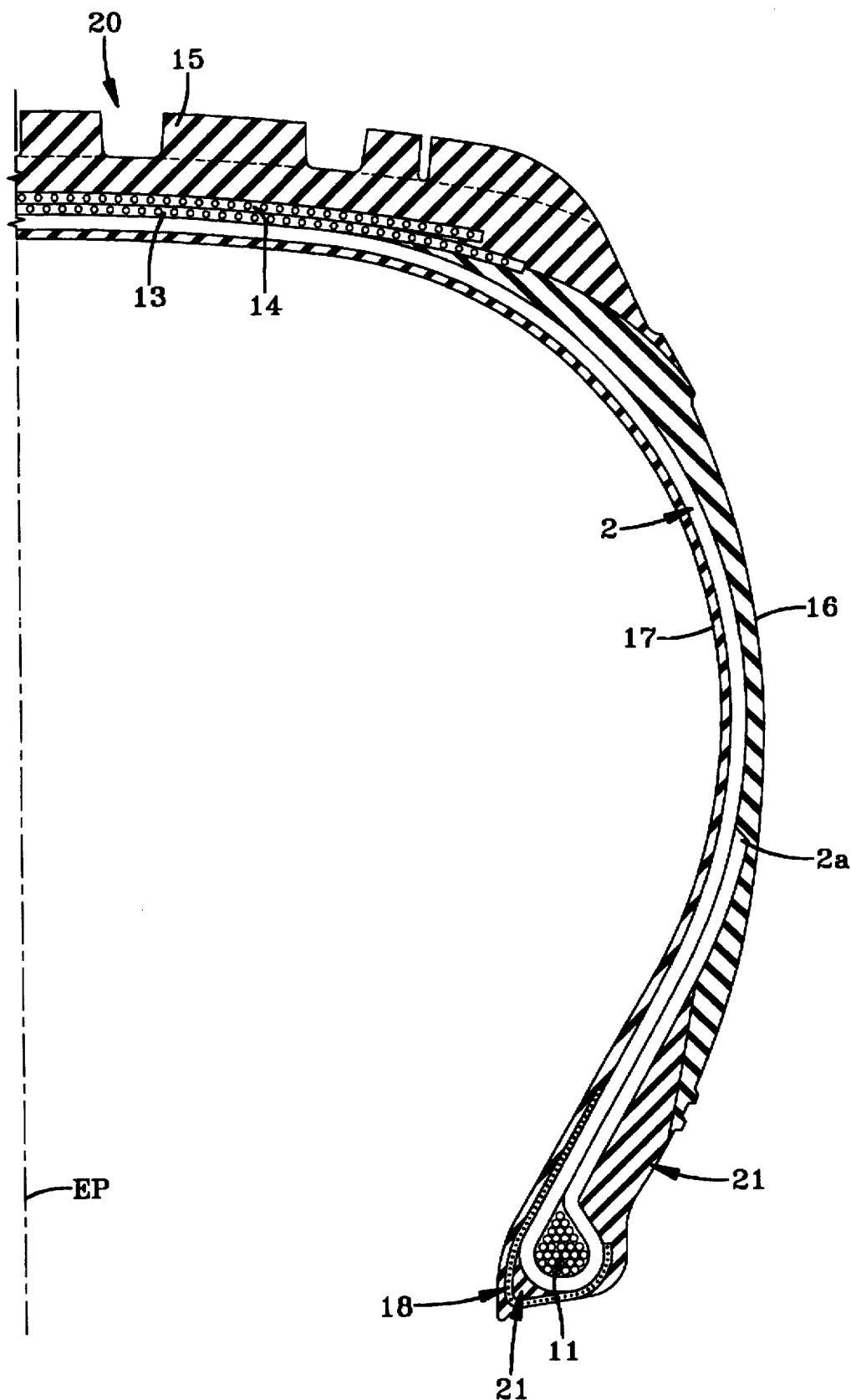
FIG. 3 is a fragmentary cross-sectional view of a radial ply tire of the present invention.

FIG. 3 shows a fragmentary cross-sectional view of a tire 20 of the present invention. The tire 20 has a pair of bead cores 11 (only one shown) which each comprise a plurality of metallic filaments. The tire 20 is characterized by a single carcass ply 2 that extends between the bead cores 11 and a turnup portion 2A anchored around each bead core 11 a chafer member 18 wraps around the ply 2 and bead 11. A belt structure having at least two belts 13,14 is disposed radially outwardly of the main portion of the carcass ply and a ground engaging tread portion 15 is disposed radially outwardly of the belt structure. Sidewall portions 16 (one shown) extend radially inwardly from the tread portion 15 to the bead portions 21. On the axially inner side of the carcass ply, an innerliner 17 may be used. The innerliner consists of a layer or layers of elastomer or other material that form the inside surface of the tire and contains the inflating fluid, such as air, within the tire 20. It may be desirable to place additional barriers, reinforcement strips or gum strips 6 (not shown) at suitable locations between the innerliner 17 and main portion of the carcass ply to avoid penetration of rubber through the carcass ply during curing.

One critical aspect of the invention is a single ply carcass construction reinforced with parallel metallic cords 1 composed of the above-described filaments 9. There are a number of metallurgical embodiments which result in the tensile strength defined above. One way of achieving such strength is by merging the proper process and alloys as disclosed in U.S. Pat. No. 4,960,473 and 5,066,455, which are hereby incorporated by reference in its entirety herein, with a steel rod microalloyed with one or more of the following elements: Ni, Fe, Cr, Nb, Si, Mo, Mn, Cu, Co, V and B. The preferred chemistry is listed below in weight percentages:

C 0.88 to 1.0
Mn 0.30 to 0.05
Si 0.10 to 0.3
Cr 0 to 0.4
V 0 to 0.1
Cu 0 to 0.5
Ni 0 to 0.5
Co 0 to 0.1 the balance being iron and residuals

The resulting rod is then drawn to the appropriate tensile strength.

For equal filament diameters, the cords used in the present invention have higher strength and generally higher fatigue life over prior art tensile cords. These advantages lead to pneumatic tires which have less reinforcement material and thus lower weight and cost. Further the life of the tire can be increased with the increase in fatigue life of the cord 1 and its filaments 9. When the new cord structures incorporate filaments 9 having a smaller diameter, there is a resulting reduction in gauge material making the tires lighter in weight and less costly.

The cords 1 for use in the single ply carcass ply may comprise from one (monofilament) to multiple filaments. The number of total filaments 9 in the cord 1 may range from 1 to 13. Preferably, the number of filaments in per cord 1 ranges from 6 to 7. The individual diameter (D) of each filament 9 generally ranges from 0.10 to 0.30 mm for each filament having at least a tensile strength of $(-2000 \times D + 4400) \times 95\%$ where D is the filament diameter in mm. Preferably, the diameter of each filament ranges from 0.15 to 0.22 mm.

Another critical property of the steel cord 1 is that the total elongation for each filament in the cord must be at least 2 percent over a gauge length of 25 centimeters. Total elongation is measured according to ASTM A370-92. Preferably, the total elongation of the cord ranges from about 2 percent to 4 percent. A particularly preferred total elongation ranges from about 2.2 to about 3.0 percent.

The torsion values for the steel for the filament used in the cord should be at least 20 turns with a gauge length of 200 times the diameter of the wire. Generally, the torsion value ranges from about 20 to about 100 turns. Preferably, the torsion values range from about 30 to about 80 turns with a range of from about 35 to 65 being particularly preferred. The torsion values are determined according to ASTM Test Method E 558-83 with test lengths of 200 times the diameter of the wire.

There are a number of specific metallic cord constructions for use in the single carcass ply. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+9, 1+5+1 and 1+6+1 or 3+9+1, the outer wrap filament may have a tensile strength of 2500 MPa or greater based on a filament diameter of 0.15 mm. The most preferred cord constructions including filament diameters are 3×0.18, 1+5×0.18, 1+6×0.18, 2+7×0.18, 2+7×0.18×1×0.15, 3+9×0.18+1×0.15, 3+9×0.18, 3×0.20+9×0.18 and 3×0.20+9×0.18+1×0.15. The above cord designations are understandable to those skilled in the art. For example, designation such as 2×, 3×, 4×, and 5× mean a bunch of filaments; ie, two filaments, three filaments, four filaments and the like. Designation such as 1+2 and 1+4 indicate, for example, a single filament wrapped by two or four filaments.

The carcass ply 12 has a layer of the above-described steel cords arranged so as to have from about 5 to about 100 ends per inch (≈2 to 39 ends per cm) when measured at the equatorial plane of the tire. Preferably, the layer of cords are arranged so as to have about 7 to about 20 ends per inch (≈2.7 to 8 ends per cm) at the equatorial plane. The above calculations for ends per inch are based upon the range of diameters for the cord, strength of the cord and the practical strength requirement for the carcass ply. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord.

The metallic cords of the carcass ply 12 are oriented such that the tire according to the present invention is what is commonly referred to as a radial. The steel cord of the carcass ply intersect the equatorial plane (EP) of the tire at an angle in the range of from 75° to 105°. Preferably, the steel cords intersect at an angle of from 82° to 98°. The preferred range is from 89° to 91°.

The fabric 2 has a plurality of fine diameter cords 1 with the cord diameter C less than 0.75 mm. The cord can be any of the before mentioned cords including but not limited to 1+5×0.18 mm or 3×0.18 mm or a monofilament wire having a diameter of about 0.25 mm, preferably 0.175 mm. It is considered desirable that these cords 1 have filaments 9 having a minimum tensile strength of at least 3500 MPa and over 2.0 percent elongation, preferably about 4000 MPa and over 2.5 percent elongation. Due to the tremendous strength and very small diameter of filaments and cords have exceptional flexibility making the cord material less subject to fatigue failure of conventional larger diameter low tensile strength steel filaments and cords. This feature combined with a minimum encapsulation of the cords into the elastomeric material 3 enables the lap splice joint 10 to be used. Ideally the total gauge thickness g of the elastomeric material 3 should be in the range of C plus 0.22 mm to C plus 1.25 mm. Thus, for a cord diameter C of 0.54 mm the total gauge thickness of the fabric is in the range of 0.76 mm to 1.79 mm. The very minimal thickness g means that upon assembly of the tire the radial difference 7 due to the rubber gauge is between 0.22 and 1.25 mm. During vulcanization this distance is further reduced due to the flow of the elastomer 3 under the heat and pressure of the curing presses. This minimal distance insures that the tensile stress differences between the overlapped cords is minimal while still maintaining a minimal rubber barrier between the overlapped cords 1. These features, all in combination, yield a highly flexible joint of steel reinforced cords.

The thinness of the ply component 2 generally reduces hysteresis, improves rolling resistance properties, reduces overall tire weight and can be made at about the same or slightly lower cost than the synthetic cord radial ply fabric.

Historically, the very thin ply stock gauge g meant butt splices could not be employed efficiently and the use of lap splices was not effective until the development of these very high tensile steel cords. The normal or conventional steel cord had to be of a large diameter to sufficiently carry the tensile load required for a tire. This meant that normal tensile steel cords of approximately 0.7 mm or greater were butt spliced. These new very high tensile cords, permit very thin gauge ply stock to be used to make the radial ply 2.

It is believed that the preferred method of assembling a steel cord reinforced radial ply fabric 2 in a tire has the following steps: a) orienting uniformly spaced parallel fine diameter steel cords 1; (b) encapsulating the oriented cords in a thin layer of unvulcanized elastomeric material 3 forming a fabric 2; (c) cutting the fabric 2 to width W and splicing the length ends parallel to the cords 1 thus forming a radial ply fabric 2; (d) cutting the fabric 2 to a desired length creating a first and second end 4,5; and (e) lap splicing the first and second ends 4,5 whereby each lap splice 10 has at least one cord 1 of each end 4,5 overlap at least one cord 1 of the opposite end 4,5.

A pressure stitching of the lap splice region may be done to attain adequate unvulcanized strength between the joint pieces for proper processing on the tire machine.

Additionally, the method may include applying a strip 6 of unvulcanized elastomeric material, the material 6 being either unreinforced or synthetic fabric reinforced, to at least one surface of the fabric 2 overlapping the lap splice 10.

What is claimed is:

1. A steel cord reinforced tire radial ply fabric having a first and second end, the fabric comprising:

a plurality of uniformly spaced fine diameter steel cords, the cords having a diameter C in millimeters and one or more filaments each filament having a diameter D and a tensile strength of at least $(-2000D+4400 \text{ MPa}) \times 95\%$ where D is the diameter of the filament in millimeters, C being less than 0.75 mm;

an elastomeric material encapsulating the cord material, the elastomeric material having a gauge thickness in the range of the cord diameter C plus 0.22 mm to C plus 1.25 mm; and wherein prior to vulcanization, the first and seconds ends are lap spliced overlapping and substantially aligning at least one cord of the respective first and second ends in the circumferential direction of the fabric.

2. The steel cord reinforced tire radial ply fabric of claim 1 wherein the steel cords are each a monofilament wire having a diameter D of 0.25 mm or less.

3. The steel cord reinforced tire radial ply fabric of claim 1 wherein the steel cords are each a 1+5×0.18 mm steel cord.

4. The steel cord reinforced tire radial ply fabric of claim 1 wherein the steel cords each have a construction of from 2× to 5×.

5. The steel cord reinforced tire radial ply fabric of claim 1 further comprising a gum strip ached to and covering the lap spliced first and second ends along at least one surface of the spliced fabric.

6. The steel cord reinforced tire radial ply fabric of claim 1 further comprising a fabric strip attached to and covering the lap spliced first and second ends along at least one surface of the spliced fabric.

7. The steel cord reinforced tire radial ply fabric of claim 1 wherein the steel cord diameter C is 0.54 mm and the gauge thickness is in the range of 0.76 to 1.79 mm.

8. The steel cord reinforced tire radial ply fabric of claim 2 wherein the monofilament wire diameter D of the fabric is about, 0.175 mm.

9. The steel cord reinforced tire radial ply fabric of claim 1 wherein the filament diameter D is in the range of 0.15 mm to 0.22 mm and the filament tensile strength is 4000 MPa or greater.

10. The steel cord reinforced tire radial ply fabric of claim 1 wherein the uniform spacing of the steel cords is in the range of 5 to 100 ends per inch (2 to 39 ends per cm).

11. The steel cord reinforced tire radial ply fabric of claim 10 wherein the uniform spacing of the steel cords is at 14 ends per inch.

12. The steel cord reinforced tire radial ply fabric of claim 10 wherein the uniform spacing of the steel cords is at 28 ends per inch.

13. The method of assembling a steel cord reinforced radial ply fabric in a tire comprises the steps of:

orienting uniformly spaced parallel fine diameter steel cords, the cords having a diameter C in millimeters and one or more filaments each filament having a diameter D and a tensile strength of at least $(-2000D+4400 \text{ MPa}) \times 95\%$ where D is the diameter of the filament in millimeters, C being less than 0.75 mm, encapsulating the oriented cords in a thin layer of unvulcanized elastomeric material forming a fabric, the elastomeric material having a gauge thickness in the range of the cord diameter C plus 0.22 mm to C plus 1.25 mm;

cutting the fabric to width and splicing the length ends parallel to the cords thus forming a radial ply fabric;

cutting the fabric to a desired length creating a first and second end; and lap splicing the first and second ends whereby prior to vulcanization the lap splice has at least one cord of each end overlapped and substantially aligned with at least one cord of the opposite end.

14. The method of claim 13 further comprising the step of applying a strip of unvulcanized elastomeric material to the fabric covering the lap splice along at least one surface of the spliced fabric.

15. The method of claim 14 wherein the strip of unvulcanized elastomeric material has synthetic cord reinforcement.

16. A radial ply pneumatic tire having a tread and a carcass, the carcass comprising;

a single steel cord reinforced tire ply fabric having a first and second end, the fabric comprising a plurality of uniformly spaced free diameter steel cords, the cords having a diameter C in millimeters and one or more filaments each filament having a diameter D and a tensile strength of at least $(-2000D+4400 \text{ MPs}) \times 95\%$ where D is the diameter of the filament in millimeters, C being less than 0.75 mm, an elastomeric material encapsulating the cords, the elastomeric material having a gauge thickness in the range of the cord diameter C plus 0.22 mm to C plus 1.25 mm, and wherein prior to vulcanization the first and second ends are lap spliced overlapping and substantially aligning at least one cord of the respective first and second ends in the circumferential direction of the fabric.

* * * * *